United States Patent [19]
Cooper

[11] Patent Number: 4,591,872
[45] Date of Patent: May 27, 1986

[54] X-Y DISTINGUISHABLE MULTI-TRACE CODING FOR MULTIPARAMETER RECORDING OF A SINGLE STYLUS RECORDER

[75] Inventor: Edward Cooper, San Diego, Calif.

[73] Assignee: Power Science, Inc., San Diego, Calif.

[21] Appl. No.: 659,252

[22] Filed: Oct. 10, 1984

Related U.S. Application Data

[63] Continuation of Ser. No. 423,602, Sep. 27, 1982, abandoned.

[51] Int. Cl.⁴ .................... G01D 9/36; G01D 15/16
[52] U.S. Cl. ..................... 346/62; 346/33 TP; 346/34; 346/45; 346/139 C
[58] Field of Search ............ 346/33, 45, 62, 136, 346/34, 139 C

[56] References Cited

U.S. PATENT DOCUMENTS

| | | | |
|---|---|---|---|
| 3,596,281 | 7/1971 | Lombardi | 346/34 |
| 4,179,701 | 12/1979 | Bartschi | 346/62 |
| 4,212,016 | 7/1980 | Ruhl | 346/62 |
| 4,331,963 | 5/1982 | Dahlstrom et al. | 346/62 |

Primary Examiner—E. A Goldberg
Assistant Examiner—Gerald E. Preston
Attorney, Agent, or Firm—Brown, Martin & Haller

[57] ABSTRACT

A system for providing X-Y trace coding of multiple parameter recordings through use of a single stylus, single trace recorder by multiplexing multiple signals to the recorder with given time intervals for each multiplexing channel, and in a separate mode by superimposing predetermined waveforms upon the signal information, which superimposed waveforms in coordination with the time the signals are supplied to the recorder and the time of movement of the recorder, moves the stylus to record a given indicia or design, identifying a given channel of information on the single trace recording.

4 Claims, 8 Drawing Figures

X-Y DISTINGUISHABLE MULTI-TRACE CODING FOR MULTIPARAMETER RECORDING OF A SINGLE STYLUS RECORDER

This is a continuation of application Ser. No. 423,602 filed Sept. 27, 1982, now abandoned.

BACKGROUND OF THE INVENTION

Conventional techniques for recording electrical or other physical events on strip chart recorders require either single or multiple trace recorders. Multiple trace recording is required if there are several parameters that must be recorded essentially simultaneously to obtain a condensed record which establishes the correct time relationship of the various parameters and events with respect to time and to each other. Conventional multi-trace recorders may have either several meter movements, mounted side by side so that each one can write over a designated space on the chart paper, or there may be only a single recording meter movement which might be multiplexed to various input circuits, and simultaneously with the input multiplexing there might be a special multicolor ribbon that is mechanically multiplexed in synchronism so that each multiplexed input channel corresponds with a given color on the strip chart. There are also some mechanical arrangements where several recording meter movements are staggered in a unique manner so that each movement can write (with a different color) over the whole width of the chart paper without the individual pens interfering with each other. There are also recorders available with a mechanically multiplexed input selector switch which alternates between two separate input circuits. In order to identify one of the two input channels there is a mechanism that lifts the recorder pen for a moment away from the chart paper during the recording time of one of the channels. This then produces a broken trace in the recording of one channel.

Various techniques are used to write the recording traces. There are, for example, ink pens, multicolor ribbons (similar to a typewriter); heated pens which write on special heat sensitive chart paper; and impact recorders which utilize special pressure sensitive chart paper with a pressure bar that periodically impacts the pointer of a meter movement or the recorder against the sensitive paper surface. This latter technique produces essentially a dot pattern. However, if the chart paper moves slowly, it will cause the individual dots to flow into each other so that they appear as a continuous trace. This last type of recording mechanism is very popular because it is relatively inexpensive as compared to other techniques. However, since it uses pressure sensitive chart paper, it is essentially limited to single channel recording for a given meter movement. Of course, there are multiple trace impact recorders available where several movements are mounted side by side. All multiple trace recorders are very expensive, and they require extensive repair and maintenance at frequent intervals. Consequently, there is a need for new recording techniques of multiple trace recordings on single movement strip chart recorders.

SUMMARY OF THE INVENTION

A new multiplexing technique to record two parameters on a single trace recorder was disclosed in U.S. Pat. No. 4,151,464. In that disclosure, two worst case parameters (such as a maximum and minimum) are alternatingly recorded from data that is held in memories. Unfortunately, this technique can only accommodate two parameters that never reverse their relative magnitude. For example, the maximum can never be less than the minimum, and the minimum can never be more than the maximum, However, both parameters could have the same magnitude without causing any ambiguity in the recorded traces. The two traces would simply combine to a continuous line in that case. Thus, although there are effectively two traces recorded, their relative position identifies which trace represents which parameter.

Because of the mechanical complexity and the high cost of multichannel strip chart recorders, there is a need for improved recording techniques. This invention discloses a system of multiplexing and coding of the recorded traces of a single pen or stylus recorder so that various parameters are identified by characteristic shapes of the individual, multiplexed segments. This system for coding a given marking design for each channel of signal information recorded in a multiplexed system is particularly useful for recorders that utilize the previously described "impact" writing mechanism.

In an illustrative embodiment of this invention, a means for multiplexing multiple parameter signals to a recorder is coordinated by moving means for moving the recording stylus. The moving means has timing means for timing the particular time duration of each interval that a given parameter signal is supplied to the recorder. This time interval in coordination with the time of movement of the recording medium or chart, provides a distinctive marking indicia by the pen or stylus.

The system also provides a source of multiple waveforms through a source control means that selectively supplies and superimposes a given signal waveform onto the given input signal supplied to the recorder. This waveform has a magnitude level coordinated with the magnitude level of the recording system, so that the waveform moves the recording stylus in a given coded design in further coordination with the time interval that the given input signal is supplied to the recorder and with the time of movement of the recording medium. The particular coded design corresponds to a particular waveform that is provided by switch means coordinated with the channels of information multiplexed to the recorder. Thus the given signal information is recorded and identified by the coded indicia onto the recording chart through the use of a single stylus recording system.

It is therefore an object of this invention to provide a new and improved and yet simplified means for providing X-Y recording of multiple parameter signals by a single stylus trace recorder.

Other objects and many advantages of this invention will become more apparent upon a reading of the following detailed description and an examination of the drawings, wherein like reference numerals designate like parts throughout and in which, FIG. 1 is a block diagram of the system of this invention.

Figure 5:
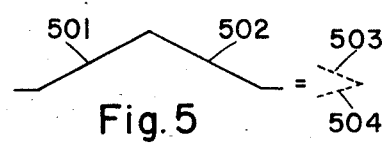
Figure 6:
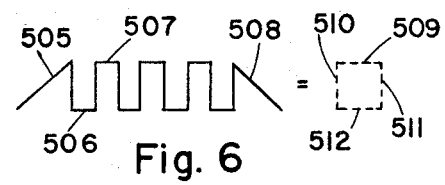
Figure 7:
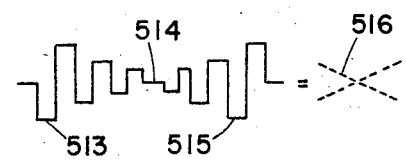

FIG. 5 and FIG. 6 and FIG. 7 each illustrate a particular waveform for coordinating a particular stylus design recording on the recording medium.

Figure 1:
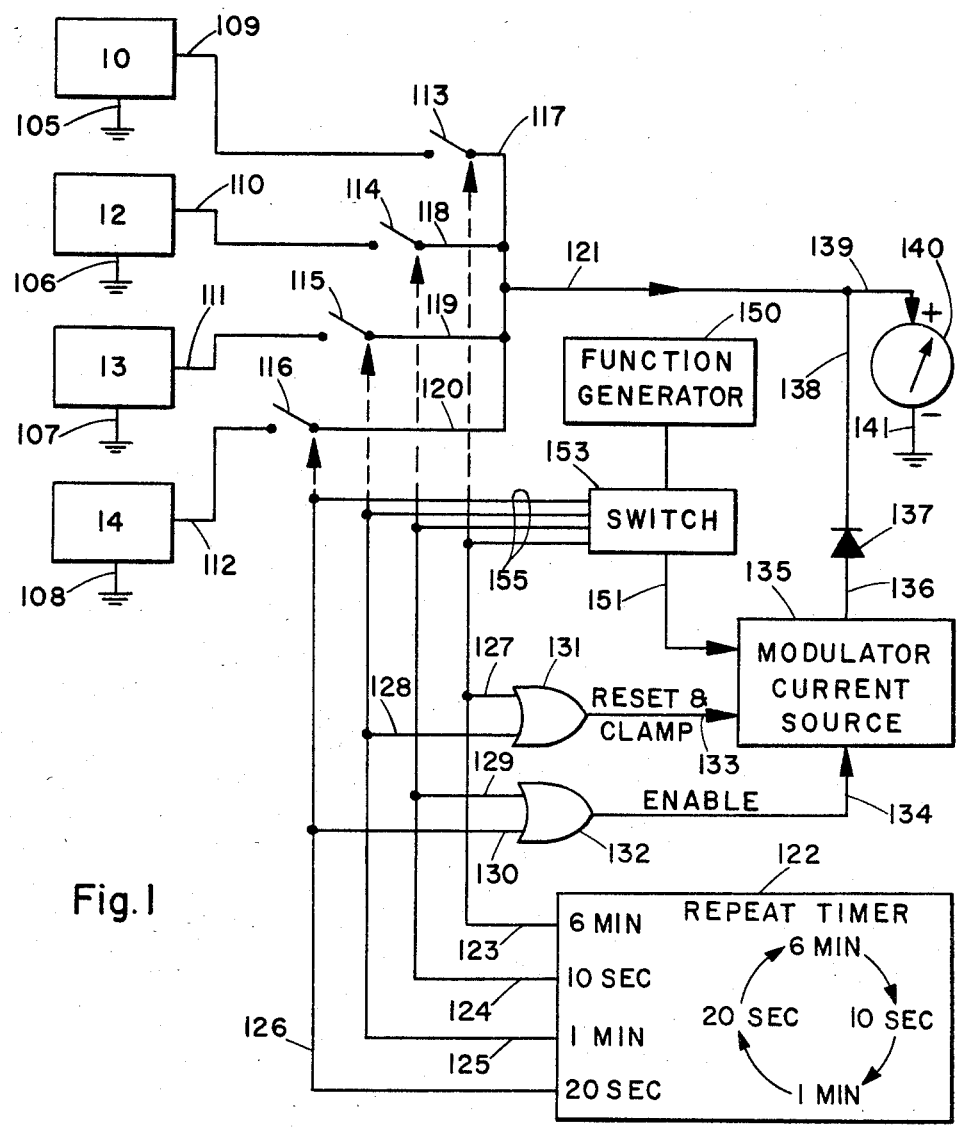
Figure 4:
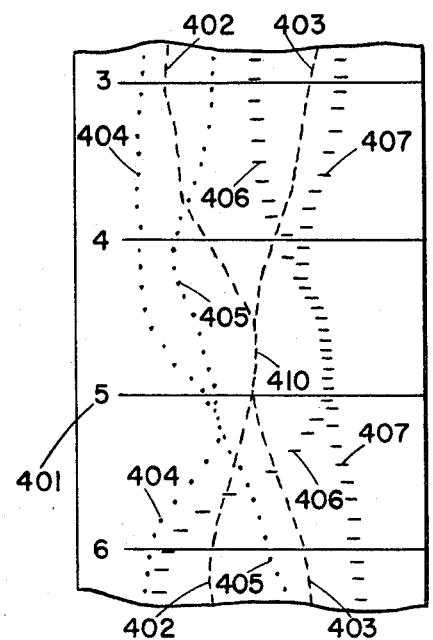
FIG. 4 is a diagrammatic illustration of an X-Y trace recording similar to that of FIG. 3 with the addition of coded recording of minimum and maximum signal parameters.
Figure 8:
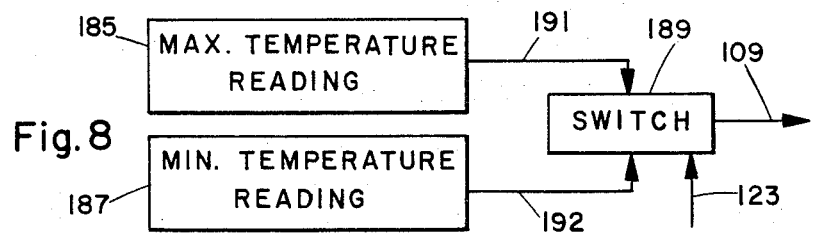

FIG. 8 is a block diagram of the circuit used in one of the signal information channels of FIG. 1 to provide the minimum and maximum readings as illustrated in FIG. 4.

Referring now to FIG. 1, a four channel multiplexer interrogates sequentially for giving set time periods sources of data of blocks 10, 12, 13 and 14 to be recorded. Signals from these data sources, may be, for example, a series of separate temperature probes that are being read out and recorded or such information being read in a memory and the memory being read out periodically to operate a single trace, strip chart recorder 140. With this circuit, four distinctly different curves are written by a single recorder movement to record separately the four separate temperature probes. The distinct character of the individual curves is achieved by coding each channel by modulation in the X and Y axis.

Figure 2:
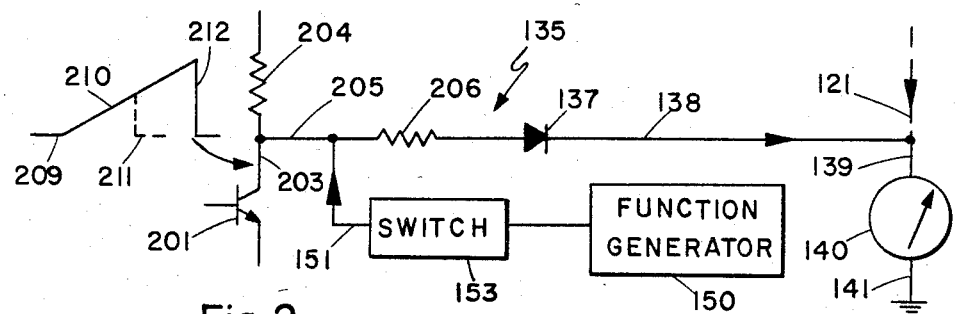
FIG. 2 is a schematic diagram and block diagram of the modulator current source and function generator system of the systems in FIG. 1.

Four separate input signals from blocks 10, 12, 13 and 14 have common ground connections 105, 106, 107 and 108, and individual output lines 109, 110, 111 and 112. The output lines connect to four input selector switching means 113, 114, 115 and 116, which have their switched output lines 117, 118, 119 and 120 connected to a common output line 121. A repeat timer 122 has four output lines 123, 124, 125 and 126 that selectively operate switches 113, 114, 115 and 116. The repeat timer 122 cycles continuously through a sequence of different time periods, each one being represented by an individual output line of lines 123, 124, 125 and 126. An OR gate 131 has two input lines 127 and 128 connected to timer output lines 123 and 125. The output of the OR gate 131 connects via line 133 as a reset and clamp input to a modulator current source 135. A second OR gate 132 has two input lines 129 and 130 connected to timer output lines 124 and 126. The output of this OR gate 132 connects through line 134 as an enable input to the modulator current source 135. The modulator output connects via line 136 and diode 137 to line 138. Both lines 121 and 138 combine into a common output line 139 that connects to a recording galvanometer or meter movement 140 that constitutes the single trace, strip chart recorder 141. The second connection to the galvanometer recorder or strip chart recorder is via line 141 to the circuit common which is at the same potential as the signal input connections 105, 106, 107 and 108. The repeat timer 122 and gates 131 and 132 are known units and can easily be constructed of many available integrated circuits. The modulator current source 135, for example as illustrated in FIG. 2, is built from readily available integrated circuits. It may receive and be driven by any desired current waveform from a known function generator 150 through switch 153 and line 151. To illustrate this, some detail of a sawtooth current generator is illustrated in FIG. 2.

Referring to FIG. 2, transistor 201 may be the output stage of an integrated circuit which generates a sawtooth output voltage 210. The collector connects via line 203 to the collector resistor 204, and also to output line 205. The sawtooth output waveform 210 is illustrated by curves 209, 210, 211 and 212. The output line 205 connects via a resistor 206 and diode 137 to line 138, and from there through line 139 to a low impedance galvanometer, strip chart recorder 140. A second input connects also to the galvanometer recorder via lines 121 and 139. If resistor 206 is very large as compared to resistor 204, it will represent virtually a no load to the sawtooth output at line 203. However, the current that flows through resistor 206 and diode 137 into the galvanometer recorder 140 will be directly proportional to the sawtooth voltage, i.e. it will start from zero and then increase steadily at a constant rate. This sawtooth current will add to whatever other signal input current is connected to the galvanometer recorder 140 from line 121.

It is to be understood that the system disclosed is illustrated as an input to a galvanometer strip chart recorder 140. In this type of system, the current and voltage levels in line 138 are set and correleated to the current and voltage levels of that in line 121, so as to provide the marking on the recorder as disclosed herein, within the range of deflection of the recorder. This current and voltage correlation is within the art. Further, the currents and voltages in lines 121 and 138 can be adjusted in relative magnitudes to drive other known recorders.

In the operation of the circuit of FIG. 1, repeat timer 122 has four successive time periods of 6 minutes, 10 seconds, 1 minute and 20 seconds. It should be understood that the number of four periods and their specific timing lengths is only used to illustrate the operation. Now assume that the timer has just started its 6 minute timing period. Output line 123 is then activated and causes switch 113 to close. Switch 113 thus connects input signal from block 10 via line 109 through lines 117, 121 and 139 to the recording galvanometer 140. Also connected to line 123 is one input of the OR gate 131, via line 127. This input causes an active output of the gate 131 on line 133. Line 133 connects as a control input to the modulator current source 135 which causes a forced reset and clamped condition so that the modulator 135 will then produce no output current in line 136. Thus, the galvanometer recorder 140 will now record input channel 10 for six minutes.

During this time period, the chart 301 (see FIG. 3) of the recorder 140 moves slowly. Assuming the recording system uses a dot marking stylus, the dots are being marked every few seconds. So the end mark on the chart, because of the dot mark displacement in the direction of chart movement, is a line 302 in the direction of the movement of the chart 301. Since there may be a slight change in the magnitude of the output from block 10 during the 6 minute period, the mark line 302 will be aligned to the general direction of the line mark 302 on chart 301.

After the six minute recording period, the timer 122 advances to the next timing cycle of 10 seconds. Output line 124 now becomes active and its signal closes switch 114. This connects the output of block 12 signal via line 110, switch 114, lines 118, 121 and 139 to the recording galvanometer 140. OR gate 132 has one of its inputs connected via line 129 to timer output line 124. Gate 132 now opens, feeding an ENABLE command via line 134 to the modulator 135. This enable command causes the modulator 135 to start operating. In this example, it is assumed that the modulator 135 produces the sawtooth output current 210 of FIG. 2. This output current 210 has a steadily rising characteristic and is injected into the recorder circuit 140 via line 136, diode 137 and line 139. Thus, the recorder 140 will now write input channel 10. However, since the sawtooth current 210 is also added into the recorder circuit 140, it will cause the recording galvanometer to move slowly towards a greater meter deflection, as illustrated in FIGS. 3, 4, 5, 6, and 7. Thus, the recorder 140 will write for the sawtooth current 210 a horizontal bar having a starting point on the chart as determined by the signal from block 12, and whose width is determined by the relative magnitude of sawtooth current and the length of time over which the sawtooth current is injected.

It should be recognized that the time length of the sawtooth current waveform is set to provide a complete displacement of dot marks for the entire 10 seconds. Because the movement of the chart paper 301 is so slow compared to the dots that occur, for example, every few seconds, the time displacement of the dot marks form a lateral line, such as line 303 of FIG. 3. In this example, channel or block 12 is recorded for a period of 10 seconds. Thereafter, the repeat timer advances to the next timing cycle which is shown here as one minute. This causes timer output line 125 to become active and close now switch 115, connecting input channel or block 13 via line 111 to the recorder circuit 140.

OR gate 131 has its second input connected via line 128 to timer line 125. Thus, gate 131 will now reset and clamp the modulator just as it did during the six minute interval signal in line 123. Consequently, the recorder 140 is now writing input channel or block 13 for a period of one minute. This provides a dot mark 304 on chart 301, as the movement of chart 301 in the one minute period is not sufficient to provide the dot line mark 302.

Thereafter, the repeat timer 122 advances to its fourth timing period, which is 20 seconds. Timer output line 126 is now active operating switch 116, and this connects input block channel 14 to the recorder circuit, via line 112 and closed switch 116, and lines 120 and 121 and 139. OR gate 132 has its second input connected via line 130 to timer line 126. This activates gate 132 so that it will enable the modulator 135 with the sawtooth input, just as it did during the 10 second cycle for input channel 12. The recorder 140 will now write a horizontal bar 305 on chart 301 which has its starting position on the strip chart 301 at a point determined by the magnitude of the input signal of block channel 14. However, since this timer cycle is 20 seconds, it will cause the sawtooth current to be injected for twice the period of time a compared to input channel 12. Consequently, the horizontal bar 305 representing input channel 14 will be exactly twice as wide as the bar 303 representing input channel 12.

After completion of the 20 second cycle, the timer starts all over with the six minute cycle, and the events repeat over and over. It should be understood that the number of timing cycles as well as the actual duration of each timing segment can be set or chosen to accommodate a significant number of input channels, all to be recorded with a single movement recorder.

Figure 3:
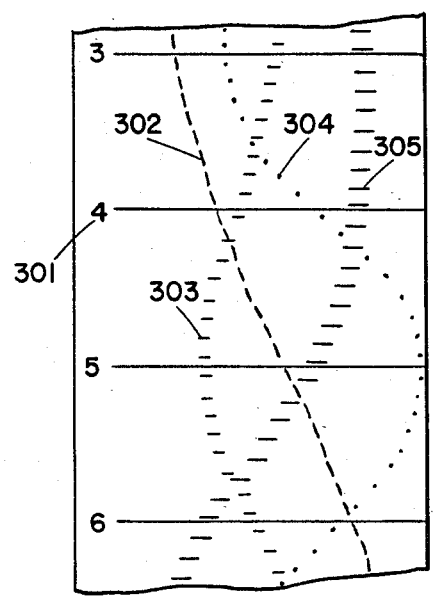
FIG. 3 is a diagrammatic illustration of the recording of coded indicia or designs on an X-Y, single stylus, trace recording of multiple parameter signals.

FIG. 3 is an example of a multiplexed, four channel recording that was described in the above description of FIGS. 1 and 2. The numbers on the left hand side of chart 301 may represent elapsed time, perhaps the hour of the day if the chart is recorded at a speed of one inch per hour. In this figure, curve 302 corresponds to the six minute recording intervals of channel 10. Curve 303 represents the 10 second intervals of channel 12, characterized by short, horizontal bars. Curve 304 represents the one minute recording intervals of channel 13. Curve 305 shows the 20 second intervals of channel 14, characterized by horizontal bars that are twice as wide as those of channel 12.

FIG. 3 is a diagrammic presentation of the advantages of coding input channels along the X and Y axis on a strip chart, where the Y axis is modulated, or coded, by controlling the time duration of individual segments, and where the X axis is coded by controlling the width of the horizontal deflection by superimposing a controlled current over the input signal. The recorded chart of FIG. 3 illustrates that with proper coding, each curve can operate over the full width of the recording chart paper 301, that all curves can cross each other, and that there are no ambiguities because each curve has its characteristic pattern.

As discussed previously, the prior art shows a method of multiplexing a recording of maximum/minimum parameters of an input signal from memories, and that the maximum and minimum could not reverse their relative magnitude and thus, no ambiguity can exist in the recorded curves since they cannot cross each other. They can, however, merge into a common trace. FIG. 4 illustrates a multiplexed maximum/minimum recording from memories where three different input signals are coded, or modulated, in a circuit of this invention. The numbers on chart 401 on the left hand side may again represent elapsed time. Curves 403 and 402 represent the maximum and minimum parameters of a first input channel. Since their relative position indicates which is the maximum and which is the minimum, both curves can utilize identical characters or mark shapes, in this case vertical strokes of identical length. Minimum and maximum parameters of a second input channel are represented by the dot patterns of curves 404 and 405. A third input channel has its maximum and minimum parameters identified by short, horizontal bars in curves 407 and 406. Thus, by combininb a timing code for Y axis modulation, and a controlled current source for X axis modulation, the system utilizes a single movement strip chart recorder for the multiplexed recording of a multitude of different events and parameters.

Referring to FIG. 8, the inputs of maximum and minimum readings, such as for temperatures, are or can be fed through the same input line, such as for example, line 109 of FIG. 1. In this embodiment, the switch 189 is a flipflop circuit that is activated by the signal in line 123 to alternatively read out the magnitudes in blocks 185 and 187 to lines 191 and 192. Thus, the reading of each block or channel 185 and 187 has the full time interval of the six minutes. This provides the correct line length of each mark and also displaces each mark 402 and 403 relative to the other on chart 401, so that when the minimum and maximum are the same, such as at 410, the two minimum/maximum signals form a recognizable line.

In the embodiment disclosed thusfar, the controlled current source has been a sawtooth waveform, which produces a horizontal bar on the strip chart. However, there are many other current waveforms that can be programmed to produce characteristic and identifiable shapes and symbols for trace identification. FIGS. 5, 6 and 7 show three examples of current waveforms that produce wedges, squares and cross marks. Curve 501 and 502 is a triangular current waveform that produces in the modulator a wedge on the strip chart as illustrated by dotted lines 503 and 504. The sloping dot pattern 503 is written during the rising current wave 501, and the return slope dot pattern 504 is marked during the falling current wave 502. The slope occurs because the set time intervals are such that the chart paper is advancing in time during the total time interval of the current curve 501 and 502. Curves 505, 506, 507 and 508 will produce essentially the square dot pattern 509, 510, 511 and 512, and a current waveform as shown from 513, 514 and 515 will produce a cross mark 516.

The particular waveforms of FIGS. 5, 6 and 7 are all generated by a known function generator 150, whose output can be pre-programmed and switched by switch 153 in response to signals in lines 155 in the known manner to provide the desired waveform at the correct time through line 151 to the modulator current source 135.

There is no limit to the number of symbols and shapes which can be generated with an X-Y modulator of this invention. However, it should be obvious that since the strip chart is moving at a constant speed, it will require more time to write distinguishable characters as compared to simple dots, strokes and bars.

Having described my invention, I now claim:

1. An apparatus for recording plural time-varying signals by a trace recorder, including a single, electromagnetically driven stylus comprising:
   timing means for providing a timing signal having a repeating sequence of respective unequal timing periods;
   multiplexing means responsive to said timing signal for, during each of said timing periods, applying a respective one of said time-varying signals to said recorder;
   modulating means responsive to said timing signal for providing, during one said timing period, a function signal having a characteristic waveform;
   summing means connected to said recorder and to said multiplexing and modulating means for, during said one timing period, adding said function signal to the timevarying signal applied during said timing period; and
   said modulating means includes a modulating signal source for generating said function signal, a first gate means responsive to said timing signal during a respective one of said timing periods for preventing said modulating signal source from providing a function signal, and second gate means responsive to said timing signal during another respective one of said timing periods for enabling said modulating signal source to provide a function signal.

2. The apparatus of claim 2 wherein said timing means includes plural output ports, each providing said timing signal during a respective one of said timing periods, and said first gate means is an OR gate having plural inputs, one of which is connected to a respective one of said timing means output ports and an output port activated whenever said one timing means output port provides said timing signal.

3. The apparatus of claim 2 wherein said second gate means is an OR gate having plural inputs, one of which is connected to another respective one of said timing means output ports, and an output port activated whenever said other respective timing means output port provides said timing signal.

4. An apparatus for recording plural time-varying signals by a trace recorder, including a single, electromagnetically driven stylus comprising:
   timing means for providing a timing signal having a repeating sequence of respective unequal timing periods;
   multiplexing means responsive to said timing signal for, during each of said timing periods, applying a respective one of said time-varying signals to said recorder;
   modulating means responsive to said timing signal for providing, during one said timing period, a function signal having a characteristic waveform;
   summing means connected to said recorder and to said multiplexing and modulating means for, during said one timing period, adding said function signal to the timevarying signal applied during said timing period,
   said modulating means is further responsive to said timing signal for, during alternate timing periods, providing respective function signals, each having a characteristic waveform which, when added by said summing means to a time-varying signal, causes said recorder to produce a predetermined coding design for said time-varying signal; and
   said modulating means further includes a first gate means responsive to said timing signal during respective alternate timing periods for preventing said modulating means from providing a function signal, and a second gate means responsive to said timing signal during other respective alternate timing periods for enabling said modulating means to provide a respective function signal.

* * * * *

UNITED STATES PATENT AND TRADEMARK OFFICE
CERTIFICATE OF CORRECTION

PATENT NO. : 4,591,872
DATED : May 27, 1986
INVENTOR(S) : EDWARD COOPER

It is certified that error appears in the above-identified patent and that said Letters Patent is hereby corrected as shown below:

```
Column 8, line 1, claim 2, cancel "2" and insert --1--.
```

Signed and Sealed this

Twenty-eighth Day of October, 1986

[SEAL]

*Attest:*

DONALD J. QUIGG

*Attesting Officer*　　*Commissioner of Patents and Trademarks*